US006577607B1

(12) United States Patent
Mitts et al.

(10) Patent No.: US 6,577,607 B1
(45) Date of Patent: Jun. 10, 2003

(54) NETWORK STRUCTURE FOR REALIZING PART OF A WIRELESS ATM SYSTEM AND METHOD FOR EXECUTING INTER-SWITCH HANDOVER IN SAID NETWORK STRUCTURE

(75) Inventors: Håkan Mitts, Helsinki (FI); Harri Hansen, Espoo (FI); Jukka Immonen, Espoo (FI)

(73) Assignee: Nokia Mobile Phones, Ltd., Espoo (FI)

( * ) Notice: Subject to any disclaimer, the term of this patent is extended or adjusted under 35 U.S.C. 154(b) by 0 days.

(21) Appl. No.: 08/993,342

(22) Filed: Dec. 18, 1997

(30) Foreign Application Priority Data

Dec. 20, 1996 (FI) .................................................. 965148

(51) Int. Cl.[7] .............................................. H04L 12/28
(52) U.S. Cl. ...................... 370/310.1; 370/256; 370/408
(58) Field of Search ................................. 370/331, 395, 370/351, 397, 338, 399, 400, 256, 310.1, 395.1, 396, 395.2, 395.3, 408–410; 455/436, 439, 440; 709/220–226, 239–242, 252, 351, 338

(56) References Cited

U.S. PATENT DOCUMENTS

| 5,345,448 A | 9/1994 | Keskitalo .................... 370/95.3 |
| 5,410,733 A | 4/1995 | Niva et al. .................... 455/33.2 |
| 5,483,668 A | 1/1996 | Malkamaki et al. ........ 455/33.2 |
| 5,487,065 A | 1/1996 | Acampora et al. .......... 370/60.1 |
| 5,524,009 A | 6/1996 | Tuutijarvi et al. .......... 370/95.3 |
| 5,590,126 A | 12/1996 | Mishra et al. ............... 370/329 |
| 5,633,866 A | * 5/1997 | Callon ......................... 370/397 |
| 5,831,975 A | * 11/1998 | Chen et al. .................. 370/256 |
| 5,872,773 A | * 2/1999 | Katzela et al. .............. 370/256 |
| 5,889,770 A | * 3/1999 | Jokiaho et al. .............. 370/337 |
| 5,933,412 A | * 8/1999 | Choudhury et al. ........ 370/218 |
| 5,940,381 A | * 8/1999 | Freeburg et al. ............ 370/331 |
| 6,026,077 A | * 2/2000 | Iwata ........................... 370/254 |
| 6,078,575 A | * 6/2000 | Dommety et al. .......... 370/338 |

FOREIGN PATENT DOCUMENTS

| EP | 0281334 A3 | 9/1988 |
| EP | 0589552 A3 | 3/1994 |

OTHER PUBLICATIONS

"Private Network–Network Interface Specification Version 1.0" by the ATM Forum.

* cited by examiner

Primary Examiner—Chau Nguyen
Assistant Examiner—Andy Lee
(74) Attorney, Agent, or Firm—Perman & Green, LLP (57) ABSTRACT

In a network structure according to the invention for realising a radio extension of an ATM network, only part of the switches of the ATM network are provided with functions required for supporting wireless terminals. In between these wireless-specific switches, there are provided individual connections in order to distribute control and management information. The wireless-specific switches and the individual connections therebetween form a parallel, tree-like PNNI node structure in relation to the rest of the ATM network, so that the wireless-specific switches belong, in addition to said PNNI node structure, also to the node structure of the regular ATM network. With a structure like this, the additions required by the support of wireless terminals in the PNNI protocol remain very slight.

6 Claims, 4 Drawing Sheets

NETWORK STRUCTURE FOR REALIZING PART OF A WIRELESS ATM SYSTEM AND METHOD FOR EXECUTING INTER-SWITCH HANDOVER IN SAID NETWORK STRUCTURE

FIELD OF THE INVENTION

The invention relates generally to procedures aiming at the mobility of a wireless terminal in a data transmission network, where data is transmitted in packages, i.e. cells. The invention particularly relates to an advantageous network structure for supporting wireless terminals and to a method for executing a handover in such a network structure.

BACKGROUND ART

The ATM (Asynchronous Transfer Mode) network is a data transmission system where data is transferred in digital form as 53-byte cells from one terminal to another through switches and rapid transfer connections therebetween. Each cell contains a 48-byte payload and a 5-byte header. In order to save space, the header information of each cell does not include complete address information describing the used data transfer route from the transmitting to the receiving device, but only information of the virtual path and channel where said data transfer connection is being carried. The switches or nodes of the network contain necessary routing information, on the basis whereof said identifiers of the virtual path and channel are interpreted as references to the respective node in succession.

It is to be expected that in the future the ATM network, which has so far been based mainly on cable connections, will also serve wireless terminals that are in contact with the network via radio base stations, i.e. access points. These wireless terminals may move with respect to the base stations and their coverage area, in which case the system must be able to execute a handover when necessary. A specific feature of each ATM connection is the contract between the terminal and the network as to the quality of service (QoS) required by the connection. This contract particularly covers the maximum length of the delays allowed in the connection and the highest allowed probability of cell loss. The agreed quality of service for the connection and its upkeep are important factors when making decisions as for the point of time of the handover and the new base station to be assigned for a given wireless terminal.

The PNNI protocol developed for the routing of a fixed ATM network defines how the switches of the ATM network can discover the network structure and transmit structural information to each other. The PNNI protocol also defines the routing method which—on the basis of said structural data, the offered traffic and the required quality of service for the connection, as well as the available resources finds the most advantageous route to the new connection.

Figure 1:
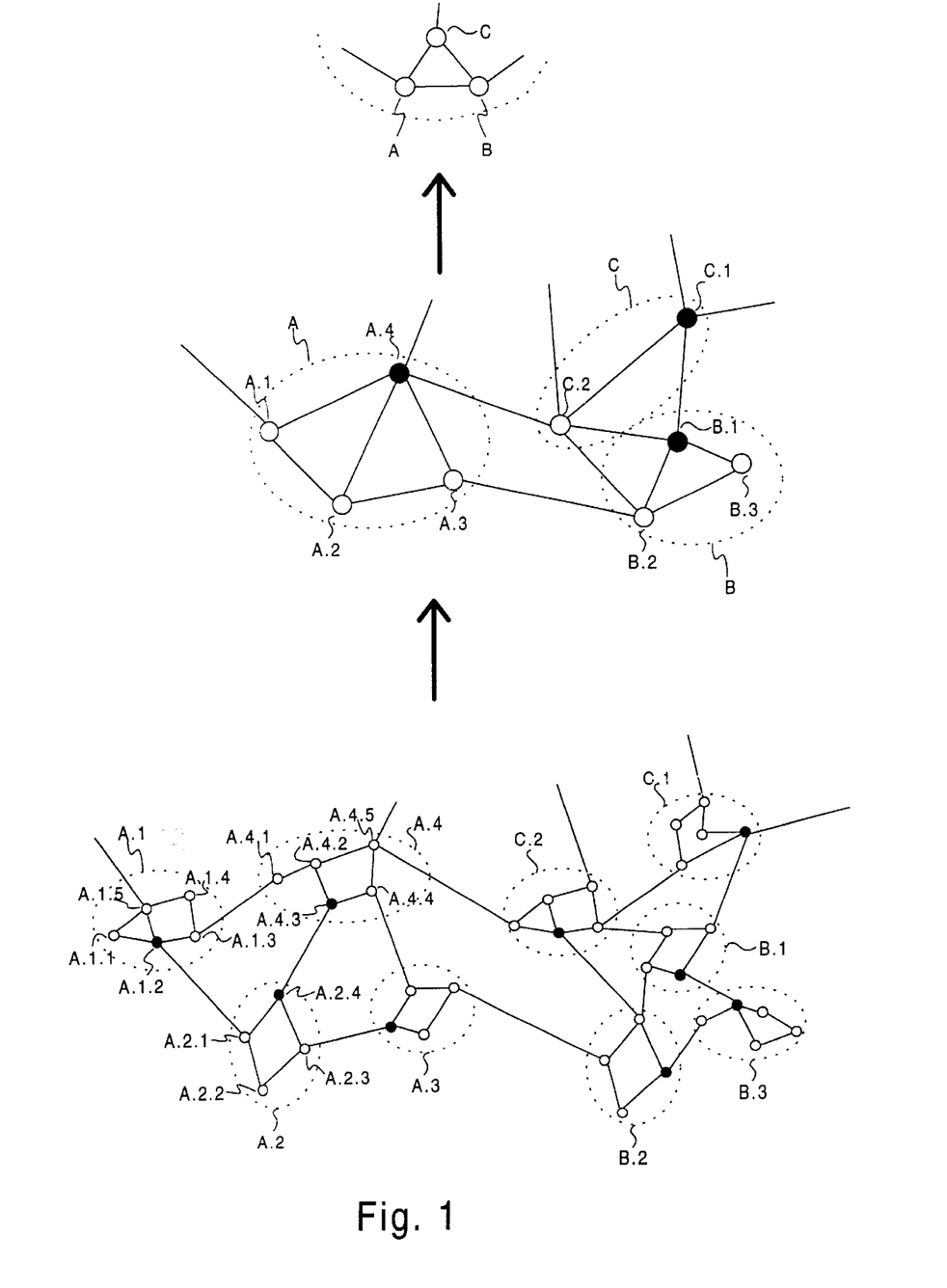
FIG. 1 illustrates a prior art PNNI network structure.

FIG. 1 illustrates an example of a network structure according to the PNNI protocol. According to the PNNI protocol the switches or nodes of the ATM network are grouped into peer groups, and one of the nodes in the group serves as the peer group leader. In FIG. 1, the peer group leaders are marked with black circles. A peer group is formed by such nodes that have a common ancestor in the PNNI address and routing hierarchy. The PNNI network structure is multi-layered: the peer group of one level forms, on the successive higher level, one logical node. The nodes of the lowest level are physical switches of the ATM network. In the PNNI protocol, each node only knows the structure of its own peer group and of those higher-level peer groups to which the peer group of said node belongs.

In a PNNI protocol each node maintains a database as for the structure of its own peer group and the connections of said peer group with other adjacent peer groups. For this purpose, the nodes transmit, at given intervals, information of their activity and their connections with other nodes via PTSE packages. Thus each node and peer group has real-time information of the network structure, so that for instance in the case of malfunction, the peer group is capable of changing the routing of connections past the damaged connection or node.

In FIG. 1, one peer group is formed for instance of the nodes A.1.1–A.1.5. On the next higher level, this peer group A.1 is represented by the logical node A.1. The nodes A.2.1–A.2.4 form another peer group A.2. On the higher level the logical nodes A.1–A.4, each of which represents a given lower-level peer group, form the peer group A. For the sake of clarity, all nodes of all peer groups are not individually specified in FIG. 1. Such lines that in the illustrations of the present application—particularly in FIGS. 1 and 2—are attached to the node at one end only represent connections directed to outside the part of the network included in the drawing. The PNNI protocol is described in more detail for instance in the publication "Private Network-Network Interface Specification Version 1.0" by The ATM Forum.

SUMMARY OF THE INVENTION

An object of the invention is to realise a network structure suited for the radio extension of an ATM network. Another object of the invention is to realise such a network structure which enables the adding of a radio extension supporting wireless terminals with minor changes to existing ATM networks.

Yet another object of the present invention is to introduce a method suited for the radio extension of an ATM network for executing an inter-switch handover.

These objects are achieved by advantageously providing only part of the ATM network switches with mobility-specific functions, by organising the access points of wireless terminals under the control of switches supporting wireless terminals, by providing logical connections between these wireless-specific switches in order to distribute control data concerning the wireless terminals, and by compiling the wireless-specific switches into a wireless-specific peer group structure.

The system according to the invention is characterised in that the structure formed by the wireless-specific switches and by the connections therebetween constitutes a parallel switch group structure with respect to the other parts of said data transmission network, in which case the wireless-specific switches belong both to a switch group of the ordinary switch group structure of said data transmission network and to a switch group of the switch group structure supporting wireless terminals.

The invention also relates to a method comprising the following steps, where a) the switch controlling the first access point sends a handover request in a wireless-specific structure to the switch preceding it in the direction the connection came from, b) in which case said preceding switch decides whether, it is the switch suited for controlling the handover:

b.1) if it is not, it sends the handover request in the wireless-specific structure to the preceding switch in the forward direction of the connection, whereafter the step b) is repeated, b.2) if it is, it starts executing the handover to a second access point.

In the network structure according to the invention for realising a radio extension of an ATM network, only part of the ATM network switches are provided with mobility specific functions, in which case the adding of a radio extension does not require the renovation of the whole network. In between wireless-specific switches, there are provided logical connections for transmitting the control and management data concerning wireless terminals. The wireless-specific switches and the connections therebetween form a PNNI node structure parallel in relation to the rest of the ATM network, in which case the wireless-specific switches belong, apart from this PNNI node structure, also to the node structure of the regular ATM network. By means of this structure, the additions required by the support of wireless terminals in the PNNM protocol remain very slight, wherefore the wireless terminal connections do not differ from the connections between regular fixed terminals with respect to the switches of a regular ATM network.

BRIEF DESCRIPTION OF THE DRAWINGS

The invention is explained in more detail below, with reference to the preferred embodiments described by way of example and to the appended drawings, where.

Like numbers for like parts are used in the drawings.

DETAILED DESCRIPTION OF THE PREFERRED

Figure 2:
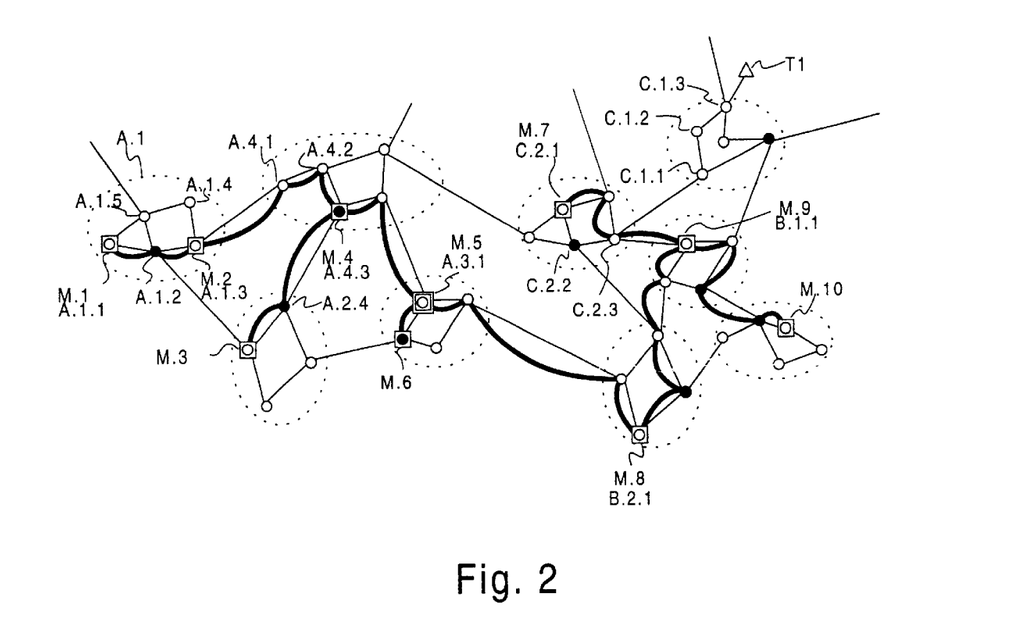
FIG. 2 illustrates a network structure according to the invention.

FIG. 2 shows an example of a network arrangement according to the invention, as applied in the fixed ATM network of FIG. 1. In FIG. 2, the wireless-specific nodes are surrounded by squares. In the network structure according to the invention, the wireless-specific switches form a parallel peer group structure with respect to the rest of the PNNI structure. The wireless-specific switches belong both to the regular peer group and to the wireless-specific peer group. For instance in FIG. 2, the wireless-specific switch M.1 belongs both to the regular peer group A.1 as its member A.1.1, and to the wireless-specific peer group, M. The peer group leader of the wireless-specific peer group is marked with a double square. In the network structure according to the invention, all switches of the network do not have to be wireless-specific. Because the access points are connected only to such switches that support wireless terminals, the mobility of the wireless terminals is invisible outside the wireless-specific peer group. Therefore it is unnecessary to inform the switches outside the wireless-specific group as to the movements of the wireless terminals and such regular switches can participate in establishing and closing connections of a wireless terminal in similar fashion as with a standard connection of a fixed terminal. Consequently, one purpose of wireless-specific groups is the distribution of the reach ability information of wireless terminals only to switches utilising said information.

In between wireless-specific switches, there must be established logical connections (MCC, Mobility Control Channel) in order to transmit PNNI messages and other messages. These connections are marked with a thick line in FIG. 2. Via these connections, the switches can transmit information of the wireless terminal inside the wireless-specific group. In the example of FIG. 2, these connections proceed in several locations through regular switches, which only transmit the traffic of these connections without otherwise participating in the signalling. The MC channels are advantageously similar to the PNNI protocol routing control channels (RCC).

The wireless-specific groups advantageously form their own peer group hierarchy according to the PNNI protocol in parallel to the PNNI hierarchy of the regular ATM network. The group hierarchy supporting wireless terminals can advantageously include switches that do not control access points but still have wireless-specific functions in their repertoire of functions, too. Such switches can be used to assist in the routing of the wireless terminal connections, which is illustrated below in the present application.

A switch belonging to a wireless-specific group, which also belongs to a regular peer group, announces the rest of the nodes in a regular peer group—according to the standard PNNI protocol, via PTSE packages—that it has established connection to a wireless-specific group. For example, the switch M.1 of FIG. 2, which is the member A.1.1 in the regular peer group A.1 (see also FIG. 1), announces the regular switches A.1.2–A.1.5, that it has established connection with the group M.

In the method according to the invention, the connection is routed through a wireless-specific structure by utilising the PNNI protocol. The use of messages according to the PNNI protocol in the handover brings about the advantage that also ordinary switches that do not support wireless terminals can participate in establishing the connection. When using standard PNNI messages, such switches need not be aware that the setup of the connection in question is related to the handover of a wireless terminal but they can proceed in similar fashion as in the setup of any regular connection. Another result from the use of the PNNI protocol in establishing connections is that every connection of a wireless terminal is routed through the network irrespective of other connections of the same wireless terminal.

In the specification below, we give an example of a routing according to a preferred embodiment of the invention in the network illustrated in FIG. 2. In this example, the terminal T1 connected to the node C.1.3 by a fixed connection calls a wireless terminal, which is connected to the node M.4 of a wireless-specific peer group, i.e. to the node A.4.3 of a regular peer group.

The node C.1.3 knows that the group C.2 has connection with the group M, and that the node C.1.1 has connection with the group C.2. The node C.1.3 sends connection request for the node C.1.1 for example via the node C.1.2. The node C.1.1 transmits the connection request for the node C.2.3. The node C.2.3 knows that the node C.2.1 has established connection with the group M, wherefore it transmits the connection request for the node C.2.1 via the node C.2.2, for instance.

Owing to the internal information in the wireless-specific peer group, the node C.2.1, i.e. the node M.7, knows that the desired wireless terminal is connected to the node M.4. As an alternative, the node M.7 may also enquire, in a separate MC channel message, as to which node is connected to the desired wireless terminal.

The node M.7 sets up connection with the node M.4 via the nodes M.9, M.8 and M.5. According to the PNNI protocol, this is carried out so that the node M.7, i.e. C.2.1, first sets up connection with the node M.9/B.1.1, which again sets up connection with the node M.8/B.2.1, which then sets up connection with the node M.5/A.3.1, which finally establishes connection with the last node M.4/A.4.3. Finally the node M.4 opens the connection to the wireless terminal.

Figure 3:
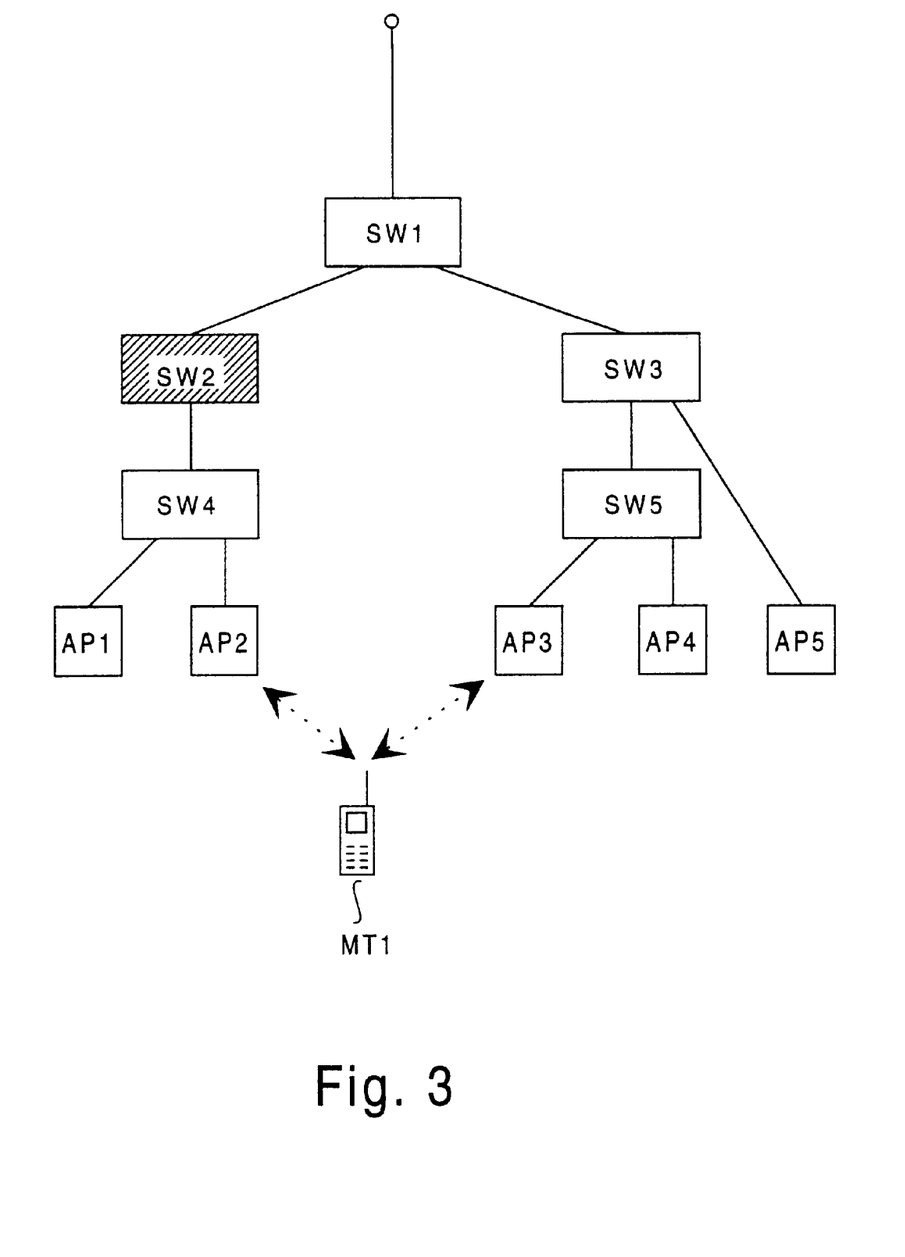
FIG. 3 shows an example of a radio extension of an ATM network in order to illustrate the handover method according to the invention.

A preferred embodiment of the handover method according to the invention is described in more detail below, by way of an example. FIG. 3 illustrates a radio extension of an ATM system, comprising a wireless terminal MT1, five access points AP1–AP5 and five switches SW1–SW5. The switch SW2 which is marked with diagonal stripes in FIG. 3 is a regular switch, and the rest of the switches are wireless-specific switches. Connection between the wireless terminal MT1 and the ATM network is first handled via the access point AP2. During normal operation, the wireless terminal MT1 keeps up a list (not illustrated) of those access points that it hears. The list may be arranged in order of preference, for instance on the basis of the quality or pricing factors of the assumed connection. As the connection with the access point AP2 becomes weaker, the wireless terminal MT1 hands the connection over to the access point AP1, AP3, AP4 or AP5, i.e. it executes the handover described below. The wireless terminal MT1 may also have several simultaneous ATM connections, and the related cell flows can be independent of each other.

In this example the switch SW2, which does not control access points, is a regular prior art switch. As is apparent from the specification below, the method according to the invention does not require that all switches participating in the setting up of the connection support wireless terminals.

For controlling the connections, there is needed a new MC channel message, which in this application is called VC_HO_REQUEST.

Figure 4:
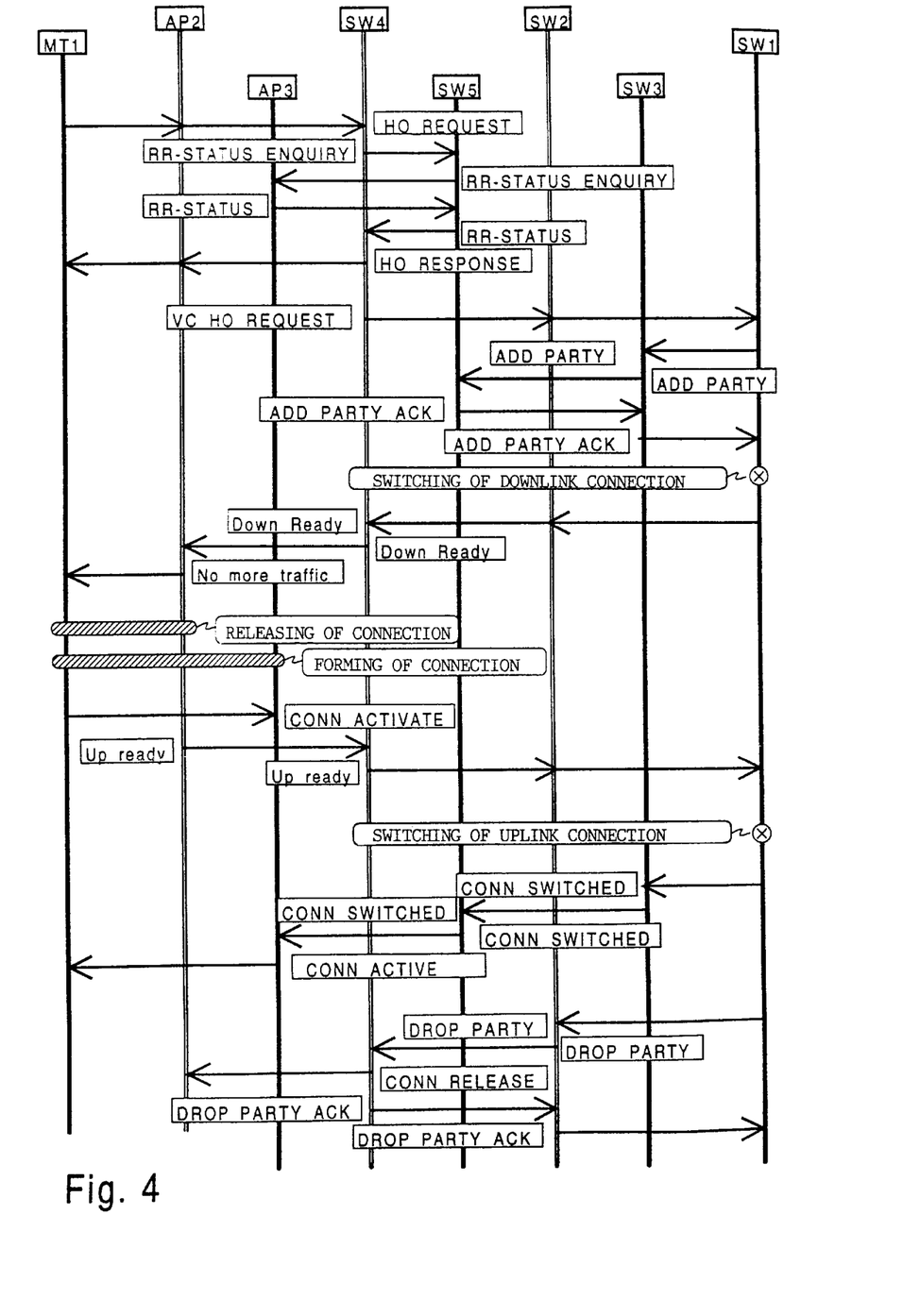
FIG. 4 shows an example of message transmission in the handover method according to the invention as applied to the structure of FIG. 3.

FIG. 4 illustrates the signalling in a system according to FIG. 3 when the wireless terminal MT1 hands over from the access point AP2 to the access point AP3. The arrows in the drawing describe messages and signals between the devices, and the name of each message and signal is written on the left or right side of the arrow in question. In this example, the handover decision is made by the wireless terminal MT1. The decision of handover may, in a system according to the invention, be also made by a switch supporting the wireless terminals of the data transmission network, for instance the switch SW4 in FIG. 3.

When the wireless terminal MT1 observes that the connection with the old access point AP2 becomes weak, it makes a decision to start the handover. The wireless terminal sends a HO_REQUEST message, which access point AP2 transmits to the switch SW4. The message may contain, among others, a list in order of preference of those access points to which the wireless terminal MT1 can hand over, i.e. of those access points whose transmission it is able to receive.

The switch SW4 controlling the old access point reserves radio connection resources for all connections of the wireless terminal by communicating directly with the switch serving the new access point. As a response to the HO_REQUEST message, the switch SW4 can decide the new access point directly, or it can send a status enquiry. i.e. a RR-STATUS_ENQUIRY message to all access-point-controlling switches in the list or to some of them in order to find out as to how the individual access points could assume the new connection to be transmitted. Each switch that receives the status enquiry transmits the status enquiry to the access points under its control, whereafter the access points survey the prevailing situation and make a preliminary reservation for the required resources as well as respond with a RR-STATUS message, which announces whether the connection could be transmitted and what is the identifier of the preliminary reservation. These messages are transmitted to the switch SW4 controlling the old access point, which switch then selects, on the basis of the received responses, for instance that access point with a positive answer that has the highest preference. Thereafter the switch SW4 sends the wireless terminal MT1, via the old access point AP2, a HO_RESPONSE MESSAGE which contains, among others, information of the new access point. Moreover, the switch SW4 sends those switches that it sent the RR-STATUS_ENQUIRY message to, a RR-DEALLOC message (not illustrated) concerning all others except the chosen access point, said message releasing the resources that were preliminarily reserved by said other access points.

The wireless terminal MT1 can make the decision of handover to a new access point immediately after receiving the HO_RESPONSE message from the switch. However, it may be advantageous for the wireless terminal MT1 to wait until the old access point AP2 has sent all downlink cells transmitted thereby. On the other hand, the wireless terminal MT1 may also decide to hand over to a new access point immediately, particularly if the quality of the radio path is poor. As for the uplink and downlink connections, the handover may take place at different points of time. Moreover, if several simultaneous connections are maintained in between the wireless terminal MT1 and the switch SW4, the handover becomes remarkably more complicated than what was described above. For instance, owing to different requirements for the quality of service, the wireless terminal may handle different connections in different ways during handover. The most advantageous fashion to determine the moment of handover is found out by simulating various functional situations computationally, or by means of trial.

After reserving the radio connection resources according to the protocol described above, the switch SW4 controlling the old access point AP2 sends, per each active connection, a VC_HO_REQUEST message on the MC channel in a wireless-specific structure to a higher switch SW1. In this example, the regular switch SW2 located in between the switches SW4 and SW1 only operates as a forwarding agent of the message. From the point of view of the switch SW2, the data communications on the MC channel are similar to regular data communications on any other channel, in which case it is capable of forwarding the message, although it is unaware of its significance.

When the message meets the first switch that identifies itself as suitable for controlling the handover, as a response to this message said switch then proceeds to control the handover. In the example of FIG. 4, this switch is the switch SW1. As a response to the VC_HO_REQUEST message, the switch SW1 sends an ADD_PARTY message, via the switch SW3, to the switch SW5 controlling the new access point.

The switch SW5 returns the acknowledge ADD_PARTY_ACK to the switch SW1. At this stage, the preparation of the new connection between the access point AP3 and the switch SW1 is already accomplished, and consequently the switch SW1 changes the routing of downlink cells towards the new access point AP3.

The switch SW1 adds a Down ready signal after the last downlink cell to be transmitted via the old access point AP2;

said Down_ready symbol can be for example an ATM cell with a given format. Because the Down_ready symbol is transmitted through the same virtual channel as the rest of the cells, its location with respect to the other cells remains constant.

If the old access point AP2 succeeds in transmitting all downlink cells forwarded therethrough to the wireless terminal MT1 (i.e. the next cell in the order of transmission is the above mentioned Down_ready signal), it finally announces the ending of downlink cells for instance by means of a given No_more_traffic flag. The inclusion of the flag in the last downlink data part to be transmitted over the radio connection is, from the point of view of data transmission, more economical than the forwarding of the whole Down_ready signal cell to the wireless terminal MT1.

Thereafter the wireless terminal MT1 and the old access point AP2 release the radio connections therebetween.

In the next step, the wireless terminal MT1 establishes new radio connections with the new access point AP3 and sends it a CONN_ACTIVATE message in order to activate the ATM connections to be transmitted. This message contains detailed information as to whether the wireless terminal has received a No_more_traffic message relating to each connection from the old access point. The message can be sent for instance in the form of a given DR_flag. The CONN_ACTIVATE message announces the new access point AP3 that the wireless terminal MT1 is ready to receive downlink cells associated with these connections.

The old access point AP2 adds, after the last forwarded uplink cell, a given Up_ready signal, the location whereof in relation to the cell flow is constant. After receiving said signal, the switch SW1 can allow the forwarding of uplink cells via the new access point AP3 without changing the mutual order of the cells.

When the switch SW1 has received the Up_ready message sent by the old access point, the switch assigns the routing of the uplink cells to the new access point AP3, and informs it to this effect with a CONN_SWITCHED message. When the new access point AP3 has received the CONN_SWITCHED message transmitted by the switch, it sends the wireless terminal MT1 a given CONN_ACTIVE message, so that the wireless terminal can start the transmission of uplink cells via the new access point AP3.

The switch SW1 terminates the connections in the direction of the old access point AP2 by sending a DROP_PARTY message according to the PNNI protocol to the switch SW4 that controlled the old access point. After receiving this message, the switch SW4 closes the connections with the access point AP2 by sending a CONN_RELEASE message.

In the illustrative description above, we introduced an exemplary method for reserving radio resources, wherein the switch controlling the old access point, requests during the handover another switch to reserve the radio connections resources required for the new connection. Radio connection resources can be reserved in many other fashions, too, for instance by predicting the movements of the wireless terminal and by reserving the radio connection resources in advance from one or several access points, to the vicinity whereof the wireless terminal will probably proceed next, in which case the handover itself is simpler and easier to carry out. The movements of the wireless terminal can be observed and anticipated for instance by the switch controlling the access point active at each particular instant, or by some other suitable switch or some other member belonging to the wireless-specific structure.

In the handover, there can be applied for instance an arrangement similar to the multiparty connection according to the PNNI protocol, in which case the data transmission is controlled by adding and removing parties from the connection at hand. The example of FIG. 4 describes this type of procedure. The invention is not, however, restricted to the example of FIG. 4, but for instance the SETUP command of the PNNI protocol can well be used in the data transmission control—the same command is used in the setting up of ordinary connections. If said SETUP or ADD_PARTY messages are employed in the handover, they must be provided, in order to enable the identification of their special nature, with an additional parameter only recognised by wireless-specific nodes.

In the above specification, a handover was described with reference to a general example. The method can be further illustrated by means of another example applied to FIG. 2. Let us assume that the access point AP2 is under the control of the switch M.1, and the access point AP3 is under the control of the switch M.3. Now M.1 sends a VC_HO_REQUEST message to the next switch higher in the tree topology, i.e. to the switch M.2 via the regular switch A.1.2. Because there is no connection to the switch M.3 branching off the switch M.2, the switch M.2 forwards the message to the switch M.4, this time via the switches A.1.3 and A.4.1. For example the switch M.4 now observes that it is located at an intersection in the tree topology and starts controlling the handover, i.e. assumes the position of the switch SW1 of the preceding description. In case the new access point should have been under the control of the switch M.6, for instance the switch M.5 could have served as the controlling switch SW1.

In connection with the description of the example of FIG. 4 above, we explained how the switch SW1 controls the handover, without defining more accurately on what grounds a given switch can decide that it is suitable for controlling the handover.

An advantageous method is to observe the incoming route of the connection. This method is suited to tree networks or for example to such networks where in the setup and routing of connections, only data transmission connections belonging to a given predetermined tree topology are used. As a continuation for the preceding preferred embodiment of FIG. 2, where a wireless terminal switches over from an access point under the control of the switch M.1 to an access point under the control of the switch M.3, let us assume that said connection has entered the wireless-specific network from the regular peer group where the switch M.8 is a regular member. Now the original procession of the connection through the wireless-specific group takes place for example as follows: M.8-M.5-M.4-M.2-M.1 AP2-wireless terminal. In this case, when the switch M.1 according to the above described example sends a VC_HO_REQUEST message on the MC channel, the switch M.2 detects that the connection to said switch is coming from the direction of the switch M.4. The route from the switch M.2 to the switch M.3 in the structure of the wireless-specific group passes via the switch M.4. If the switch M.2 should take over the control of the handover, the new outgoing connection should also proceed through the switch M.4, in which case the data to be transmitted should in vain pass back and forth between the switches M.2 and M.4. Therefore it is not advantageous that the switch M.2 should control the handover. Whereas the switch M.4, according to the same principle, is well suited to be the controlling switch in the handover, because the old connection to the switch M.1 and the new connection to the switch M.3 branch off to different directions from the switch M.4.

In the above example, the method according to the invention was described in a wireless-specific peer group constituting a tree topology. The invention is not, however, restricted to tree topologies only but the structure of the wireless-specific peer group according to the invention can also be network-like.

In a network-like structure, there is advantageously defined a small number of differing tree topologies, each of which covers all nodes in the wireless-specific peer group, but only a selected group of the connections therebetween. In the routing of the connections, there is now utilised one of these predetermined tree topologies. The tree topology to be employed can be chosen for instance by that wireless-specific switch to which the request for setting up connections first enters from outside the wireless-specific group. This setup request can come either from a wireless terminal by intermediation of the access point, or from a node of a regular peer group. In this embodiment, the above described methods for selecting the node controlling the handover can advantageously be applied.

The examples above describe a handover in situations where the connection between the wireless terminal and the old access point is released in a controlled manner. The situation is somewhat different when the connection between the access point and the wireless terminal is cut off abruptly, so that the wireless terminal must set up connection with some other access point without any preliminary preparations. In such a situation, the procedure can be for instance as follows. In order to direct the connections to a new access point, the switch controlling said access point sends on the MC channel a VC_HO_REQUEST message, provided with an identifier of the connection, announced by the wireless terminal. All wireless-specific switches that receive the VC_HO_REQUEST message compare the identifier with respective identifiers of the connections controlled by them. If a connection corresponding to the identifier is not found, the message is forwarded. When the message reaches such a wireless-specific switch through which the old connection proceeds, this switch can start controlling the handover, whereafter the handover to a new access point takes place for example as was described above.

In order to ensure that cells are not lost, during the handover there can be used for instance particular signal cells which are transmitted in the cell flow according to the same rules as regular ATM cells; by means of these cells, the access points and switches transmit information as to when the transmission of cells in a given direction will end. Moreover, advantageously the old access point receives information as to the address of the new access point, so that it can, when necessary, forward the untransmitted downlink cells to the new access point. If the old access point succeeds in transmitting all forwarded downlink ATM cells to the wireless terminal before the old connection is cut off, it adds information to that effect to the cell flow to be transmitted to the wireless terminal, in which case the wireless terminal forwards the same information to the new access point.

The illustrations of the invention represented in the present application are only examples of some possible preferred embodiments. Likewise, the names of various switches, nodes and peer groups used in the present application are only examples aiming at a clear description of the invention.

Although the present application uses the ATM network and its PNNI protocol as examples of a preferred embodiment of the invention, the same inventional idea can be applied to other switched telecommunications networks as well.

By means of the network structure according to the invention, the support of wireless terminals is added in a simple manner to existing fixed ATM networks, because regular switches and protocols used thereby can also be used in the data transmission of wireless terminals and in the setup of connections thereof.

In the above specification, the invention is explained with reference to a few preferred embodiments, but it is obvious that the invention can be modified in many ways within the scope of the inventional idea defined in the appended patent claims.

What is claimed is:

1. A system supporting wireless terminals in a data transmission network, said data transmission network comprising switches that control data transmission and data transmission connections therebetween, in which data transmission network the switches are divided into switch groups and arranged to form a hierarchical tree structure that enables the use of a Private Network-Network Interface protocol within said data transmission connections, said system including at least one wireless-specific switch supporting wireless terminals and at least one access point connected to said wireless-specific switch, wherein the arrangement formed by the wireless-specific switches and by the connections therebetween constitutes a parallel switch group arrangement in relation to other parts of said data transmission network, so that the wireless-specific switches belong both to a switch group of an ordinary switch group arrangement of said data transmission network and to a switch group arrangement supporting wireless terminals, so that some switches support both wireless and fixed terminal switching.

2. A system according to claim 1, wherein said data transmission network is an ATM data transmission network, and said switch groups are peer groups according to the private Network-Network Interface protocol.

3. A method for handing over the radio connection of a wireless terminal from a first access point to a second access point in a system, said system comprising switches controlling data transmission and data transmission connections between said switches, in which said switches are arranged to form a hierarchical tree structure that enables the use of a Private Network-Network Interface protocol within said data transmission connections, at least part of said switches being wireless-specific switches supporting wireless terminals, in which case the wireless-specific switches form a wireless-specific arrangement, so that said first access point is functionally connected to a first wireless-specific switch, and said second access point is functionally connected to a second wireless-specific switch, comprising:

a) the first wireless-specific switch controlling the first access point to send a handover request in a wireless-specific arrangement to a switch preceding it in the direction the connection came from;

b) in which case said preceding switch decides whether it is a switch suited for controlling the handover:

b.1) if the preceding switch is not suited for controlling the handover, the preceding switch sending the handover request in the wireless-specific arrangement to the switch preceding it in the direction the connection came from, whereafter step b) is repeated, and b.2) if the preceding switch is suited for controlling the handover, the preceding switch executing the handover to said second access point.

4. A method according to claim 3, wherein the switch mentioned in step b) is a switch suited for controlling the handover, if the route to the switch controlling the new access point does not pass through the switch from which the connection to said switch is coming from.

5. A method according to claim 3, wherein the method also comprises a step of said first switch reserving the radio resources required for the connection from said second access point before sending the handover request.

6. A method according to claim 3, wherein the handover comprises steps of said switch controlling the handover setting up connection between said switch and said second switch controlling said second access point;

said switch controlling the handover releasing the connection between said switch and said first switch controlling said first access point.

* * * * *